US009047818B1

(12) United States Patent
Day et al.

(10) Patent No.: US 9,047,818 B1
(45) Date of Patent: Jun. 2, 2015

(54) CMOS IC FOR MICRO-EMITTER BASED MICRODISPLAY

(75) Inventors: Jacob Day, Wylie, TX (US); Jing Li, Lubbock, TX (US); Donald Lie, Lubbock, TX (US); Zhaoyang Fan, Lubbock, TX (US); Jingyu Lin, Lubbock, TX (US); Hongxing Jiang, Lubbock, TX (US)

(73) Assignee: III-N Technology, Inc., Lubbock, TX (US)

( * ) Notice: Subject to any disclaimer, the term of this patent is extended or adjusted under 35 U.S.C. 154(b) by 843 days.

(21) Appl. No.: 13/046,725

(22) Filed: Mar. 12, 2011

Related U.S. Application Data

(60) Provisional application No. 61/316,755, filed on Mar. 23, 2009.

(51) Int. Cl.
*G06F 3/038* (2013.01)
*G09G 3/32* (2006.01)

(52) U.S. Cl.
CPC .................................... *G09G 3/3233* (2013.01)

(58) Field of Classification Search
USPC .......................................................... 345/204
See application file for complete search history.

(56) References Cited

U.S. PATENT DOCUMENTS 5,264,835 A * 11/1993 Shaw et al. ..................... 345/88
6,410,940 B1 6/2002 Jiang et al.
6,600,471 B2 * 7/2003 Lee et al. ........................ 345/90
2009/0075843 A1 * 3/2009 Jiang et al. ...................... 506/39
2009/0078955 A1 * 3/2009 Fan et al. ........................ 257/98

OTHER PUBLICATIONS

Jiang, H. X., et al., "III-Nitride Blue Microdisplays", Appl. Phys. Lett. 78, 1303 (2001).
Hofstetter, D., et al., "Multiwavelength Light Emitters for Scanning Applications Fabricated by Flipchip Bonding", IEEE Photonics Technology Letters, vol. 10, No. 10, Oct. 1998.
Suntharalingam, V., et al., "Megapixel CMOS Image Sensor Fabricated in Three-Dimensional Integrated Circuit Technology", 2005 IEEE International Solid-State Circuits Conference, Session 19, Imagers, 19.6.
van de Biggelaar, T., et al., "Passive and Active Matrix Addressed Polymer Light Emitting Diode Displays", Proceedings of SPIE, vol. 4295, pp. 134-146, 2001.
Howard, W.E., et al., "Microdisplays Based Upon Organic Light-Emitting Diodes", IBM J. Res. & Dev., vol. 45, No. 1, pp. 115-127, Jan. 2001.
Levy, Gary B., et al., "An 852× 600 Pixel OLED-on-Silicon Color Microdisplay Using CMOS Subthreshold=Voltage-Scaling Current Drivers", IEEE Journal of Solid-State Circuits, vol. 37, No. 12, pp. 1879-1889, Dec. 2002.

(Continued)

*Primary Examiner* — Waseem Moorad
(74) *Attorney, Agent, or Firm* — Lathrop & Gage LLP

(57) ABSTRACT

An active matrix microdisplay system is provided. The microdisplay system includes an array of micro-emitters. The microdisplay system also includes an array of CMOS driving circuits. Each of the CMOS driving circuits is coupled to a respective micro-emitter for controlling current to each respective micro-emitter. Each driving circuit includes metal-oxide-semiconductor field-effect transistor (MOSFET) devices, where the MOSFET devices comprise p-type metal-oxide-semiconductors (PMOSs) or n-type metal-oxide-semiconductors (NMOSs).

25 Claims, 12 Drawing Sheets

(56) References Cited

OTHER PUBLICATIONS

Joon-Chul Goh, et al., "A New Pixel Circuit for Active Matrix Organic Light Emitting Diodes", IEEE Electron Device Letters, vol. 23, No. 9, pp. 544-546, Sep. 2002.

Xiaojun Guo, et al., "Investigation on the Current Nonuniformity in Current-Mode TFT Active-Matrix Display Pixel Circuitry", IEEE Transactions on Electron Devices, vol. 52, No. 11, pp. 2379-2385, Nov. 2005.

Jyi-Tsong Lin, et al., "A Compensation Threshold Voltage Shift Pixel Circuit for Active Matrix Organic Light Emitting Diode", Proc. 26th International Conference on Microelectronics, Serbia, May 11-14, 2008.

Ashtiani, Shahin J., A 3-TFT Current-Programmed Pixel Circuit for AMOLEDs, IEEE Transactions on Electron Devices, vol. 52, No. 7, pp. 1514-1518, Jul. 2005.

Aram Shin, et al., "Design of Organic TFT Pixel Electrode Circuit for Active-Matrix OLED Displays", Journal of Computers, col. 3, No. 3, pp. 1-5, Mar. 2008.

Day, J., et al., "III-Nitride Full-Scale High-Resolution Microdisplays", Applied Physics Letters 99, American Institute of Physics, Jul. 2011.

Day, J., et al., "Full-Scale Self-Emissive Blue and Green Microdisplays Based on GaN Micro-LED Arrays", Proc. of SPIE, vol. 8268, pp. 1-8, 2012.

Lin, Jingyu, et al., "High-resolution group III nitride microdisplays", SPIE, 2011.

Cooke, Mike, "Driving forward MicroLED video displays", Semiconductor Today, Compounds & Advanced Silicon, vol. 6, Issue 6, Jul./Aug. 2011.

* cited by examiner

CMOS IC FOR MICRO-EMITTER BASED MICRODISPLAY

CROSS-REFERENCE TO RELATED APPLICATIONS

This application is a nonprovisional of, and claims the benefit of the filing date of U.S. Provisional Patent Application No. 61/316,755, filed Mar. 23, 2009, entitled "CMOS IC for Micro-emitter Based Microdisplay", the entire content of which is incorporated herein by reference.

STATEMENT AS TO RIGHTS TO INVENTIONS MADE UNDER FEDERALLY SPONSORED RESEARCH AND DEVELOPMENT

The U.S. Government has certain rights in this invention pursuant to a grant by the Department of Defense Contract No. W909MY-09-C-0014 awarded by the U.S. Army.

BACKGROUND OF THE INVENTION

Field of the Invention

The invention relates generally to microdisplay devices. More specifically, the invention relates to design and fabrication of complementary metal-oxide-semiconductor (CMOS) integrated circuit (IC) driver and control circuitry for micro-emitter based microdisplays.

Microdisplays have many military and civilian applications, such as head-mounted displays, hand-held projectors, heads-up displays, and other near-to-eye applications. Microdisplays with high resolution, power efficiency, reliability, and other merits may enable various high-performance portable applications. One category of microdisplays is modulating microdisplays, such as liquid crystal or digital mirror device (DMD) based displays. These are relatively mature in terms of technology, driven by the commercial markets of projection TV and other applications. These modulating microdisplays are blanket illuminated by separated light sources and modulated incident light on a pixel-by-pixel basis, with intrinsically low power efficiency. Due at least in part to this mode of operation, the field-of-view, brightness, and contrast of these modulation-based microdisplays are limited.

Another category is emissive microdisplays, which should provide high power efficiency that is a critical requirement for portable near-to-eye (NTE) head mounted systems or dismounted mobile systems, especially for field applications. Currently, emissive microdisplay technology is typically based on color-filtering organic light emitting diode (OLED) technology. Although dramatic progress has been made in the OLED field in the last 20 years, the electro-optical performance, power efficiency and lifetime of OLEDs are still inferior to their inorganic counterparts, LEDs. Color-filtering OLED microdisplays suffer not only from a shorter life span but also from nonuniform degradation of luminance for various colors over their lifespan. Furthermore, because of technical difficulties such as conflicting temperatures that may be required for growth of different color organic thin films, and incompatibility with conventional photolithography micro-patterning processes, full-color OLED microdisplays with high resolution based on side-by-side patterned red-green-blue (RGB) sub-pixels have not been demonstrated.

Present day, technically mature approaches utilize filtering of white OLEDs. A white OLED may be grown on a pre-patterned substrate without the necessity for post-deposition patterning, but approximately ⅔ or more of the white light source output must be removed by a filter to obtain the required RGB primary colors. For example, up to 90% of optical power from a white OLED may have to be filtered out in order to obtain a sufficiently saturated red sub-pixel. In such a case, the white OLED must be driven up to ten times brighter than the required pixel brightness, which substantially shortens a lifetime of the microdisplay. Degradation is further enhanced by the heat generated when the filters absorb light at wavelengths other than the intended color. Even with its inherent power inefficiency, color filtering OLED microdisplays represent the most widely commercialized emissive microdisplay technology used in military and commercial systems.

Recent developments have been made in inorganic LED. The electro-optical performance, power efficiency and lifetime of inorganic LEDs are still superior to their organic counterparts, OLEDs. Inorganic semiconductor materials promise a compact, robust, and reliable system. For example, in U.S. Pat. No. 6,410,940 ('940), a monochrome microdisplay based on semiconductor micro-emitters is disclosed that can provide high brightness and efficiency, high reliability and long lifetime. The '940 display is not full-color, however. In U.S. Patent Publication No. 2009/0078955 (≤955), a full-color microdisplay based on semiconductor micro-emitters is disclosed. In U.S. Patent Publication No. 2009/0075843 ('843), a semiconductor micro-emitter array is used in a biological sensor system. The system or a portable (or handheld) sensor integrates a micro-emitter array based on InAlGaN materials with a DNA or protein micro-array and a detector array that analyzes DNA sequences for detection of diseases/biological and chemical molecules. The entire contents of the foregoing '940 patent and '955 and '843 patent publications are herein incorporated by reference.

However, the fabrication of semiconductor micro-emitters is not compatible with silicon integrated circuits that provide current needed to light up or drive micro-emitters. Thus, microdisplays formed from such micro-emitters cannot be directly constructed on such IC chips.

There still remains a need for developing techniques for driving high resolution semiconductor micro-emitter based microdisplays having pixel size below 100 μm.

SUMMARY

The present invention provides a high resolution microdisplay based on semiconductor micro-emitter arrays. The present invention also provides the design and fabrication of an active matrix microdisplay driver implemented in a digital CMOS process. Design of the active matrix microdisplay driver can be done entirely in PMOS, or a combination of PMOS and NMOS with an adjustable driving current of greater than 0.01 μA per micro-emitter for a micro-emitter array. Parallel data processing may be used in the design to fulfill the timing requirements of a VGA display at 60 Hz. The micro-emitter array is fabricated using III-V semiconductors. The micro-emitter array can be integrated with the active matrix microdisplay driver or CMOS IC driver by using flip-chip bonding to form high resolution microdisplays that may be used for applications, such as portable DNA/protein micro-array.

In one embodiment, an active matrix microdisplay system is provided. The microdisplay system includes an array of micro-emitters. The microdisplay system also includes an array of CMOS driving circuits. Each of the CMOS driving circuits is coupled to a respective micro-emitter for controlling current to each respective micro-emitter. Each driving circuit includes metal-oxide-semiconductor field-effect transistor (MOSFET) devices, where the MOSFET devices comprise p-type metal-oxide-semiconductors (PMOSs) or n-type metal-oxide-semiconductors (NMOSs).

In another embodiment, a microdisplay control circuitry for controlling an array of micro-emitters of an active matrix microdisplay is provided. Each of the micro-emitters in the array has an optically active region. The control circuitry includes (i) an 8-bit shift register circuit configured to divide an input clock signal of a first frequency into eight offset clock signals of a second frequency, where the second frequency is ⅛ of the first frequency; (ii) a plurality of digital sample-and-hold circuits configured to process an 8-bit pixel data of the first frequency in parallel to convert the 8-bit digital pixel data of the first frequency to eight digital pixel data of the second frequency; (iii) a plurality of IDACs configured to receive the eight digital pixel data of the second frequency and to generate eight analog outputs; (iv) a plurality of buffers configured to receive the eight analog outputs and output eight buffered analog pixel data; and (v) a plurality of analog sample-and-hold circuits configured to output currents according to the eight buffered analog pixel data.

According to embodiments of the present invention, active matrix displays are used instead of passive matrix displays. Active matrix displays requires less data current for micro-emitters partly because current flows through each micro-emitter continuously except when the micro-emitter is addressed, which reduces energy consumption and thus increases energy efficiency of a battery for the microdisplay. Conversely, in passive matrix displays, a large pulse of current for a short period is needed.

According to embodiments of the present invention, parallel data processing are used in control circuitry. This parallel processing allows each current digital-to-analog converters (IDAC) to have an extended operation time within 320 ns instead of 40 ns. The IDACs convert digital data to analog current. This parallel processing also reduces the bandwidth needed for the buffers by a factor of eight.

According to embodiments of the present invention, PMOS capacitors are used instead of polysilicon capacitors. Polysilicon capacitor is more expensive than PMOS capacitors, because polysilicon capacitors require one more step in silicon process than PMOS capacitors. Also, when a CMOS pixel driver includes all PMOS devices, the micro-emitter can be put into a single N-well so that process well spacing is not necessary, which minimizes area for the pixel driver.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Disclosed is a semiconductor microdisplay (μDisplay), which is formed by integrating a micro-emitter array with a silicon complementary metal-oxide-semiconductor (CMOS) active matrix driver or CMOS integrated circuit (IC) driver using flip-chip bonding or aligned wafer bonding. The present invention, in particular, provides design and fabrication of an active matrix μDisplay driving circuit implemented in a 0.6 micrometer CMOS process.

Emerging applications of microdisplays require energy efficiency so that reasonable operation time can be attained with the use of a battery. This energy efficiency can be achieved by using the active matrix μDisplay driving circuit, in which each micro-emitter is addressed or driven individually. Therefore, the CMOS driving circuit for micro-emitter based microdisplay uses the active matrix approach. For an active matrix microdisplay, each micro-emitter requires its driver so that each CMOS driver or driving circuit stores data and drives each micro-emitter of the microdisplay. Several requirements are needed for the CMOS driving circuit. First, the CMOS driving circuit for each micro-emitter may have the same pitch as the micro-emitter. Second, the driver or driving circuit needs capability of signal processing. For a VGA standard, which has 640×480 pixels (a total of 307,200 pixels), or even quarter VGA (QVGA) standard, which has 160×120 pixels (a total of 19,200 pixels), it is not feasible to address or drive each pixel by using discrete components in such a small area of the microdisplay. Minimal interface between the CMOS microdisplay and the controller is required. A high performance microdisplay for video information may require a highly integrated CMOS active matrix driver or driving circuit associated with a processor.

All active matrix pixel designs use metal-oxide-semiconductor field-effect transistors (MOSFETs) to control currents through micro-emitters. One may use a p-type metal-oxide-semiconductor (PMOS) device at anodes of micro-emitters or an n-type metal-oxide-semiconductor (NMOS) device at cathodes of micro-emitters. According to embodiments of the present invention, one may characterize the MOSFET and apply an appropriate voltage to the gate of PMOS or NMOS device to draw a desired current. One may also force the desired current through the MOSFET in a diode configuration and store the gate voltage with a PMOS or NMOS capacitor.

Figure 1:
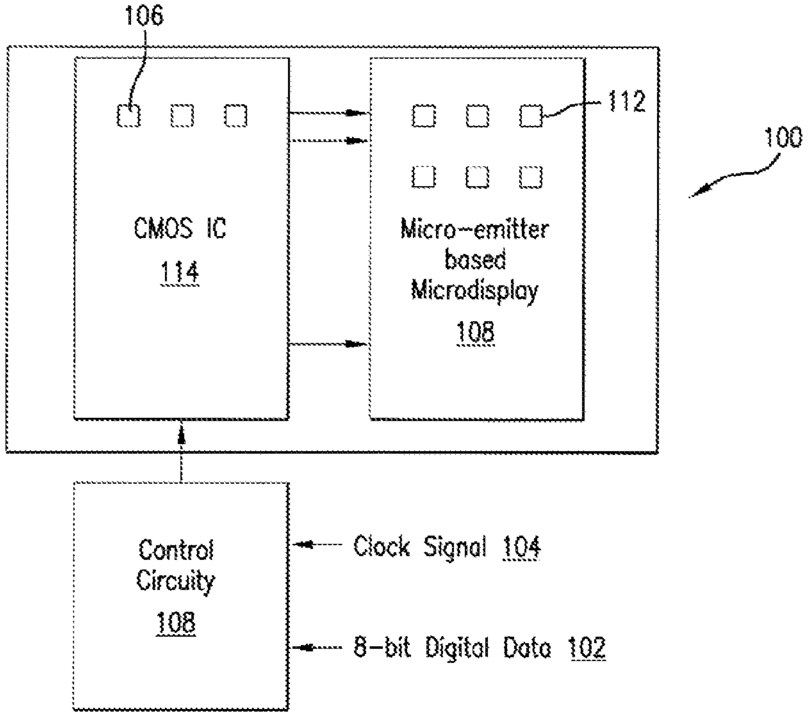
FIG. 1 is a block diagram illustrating a microdisplay with an individual driving circuit for each micro-emitter of microdisplay.

FIG. 1 is a block diagram illustrating a micro-emitter based microdisplay system 100 that includes a CMOS integrated circuit (IC) driver 114 and a microdisplay 108. FIG. 1 also includes a control circuitry 116 that receives input from input clock signal 104 and an 8-bit digital pixel data 102, where control circuitry 116 is coupled to CMOS IC driver 114.

CMOS IC driver 114 includes a number of individual pixel driving circuits 106 for each pixel or micro-emitter 112 of microdisplay 108. In a particular embodiment, for a quarter VGA that has 160×120 pixels or micro-emitters 112, CMOS IC driver 114 includes 160×120 driving circuits 106 for providing current to each pixel 112 to light up the micro-emitters 112.

Figure 2A:
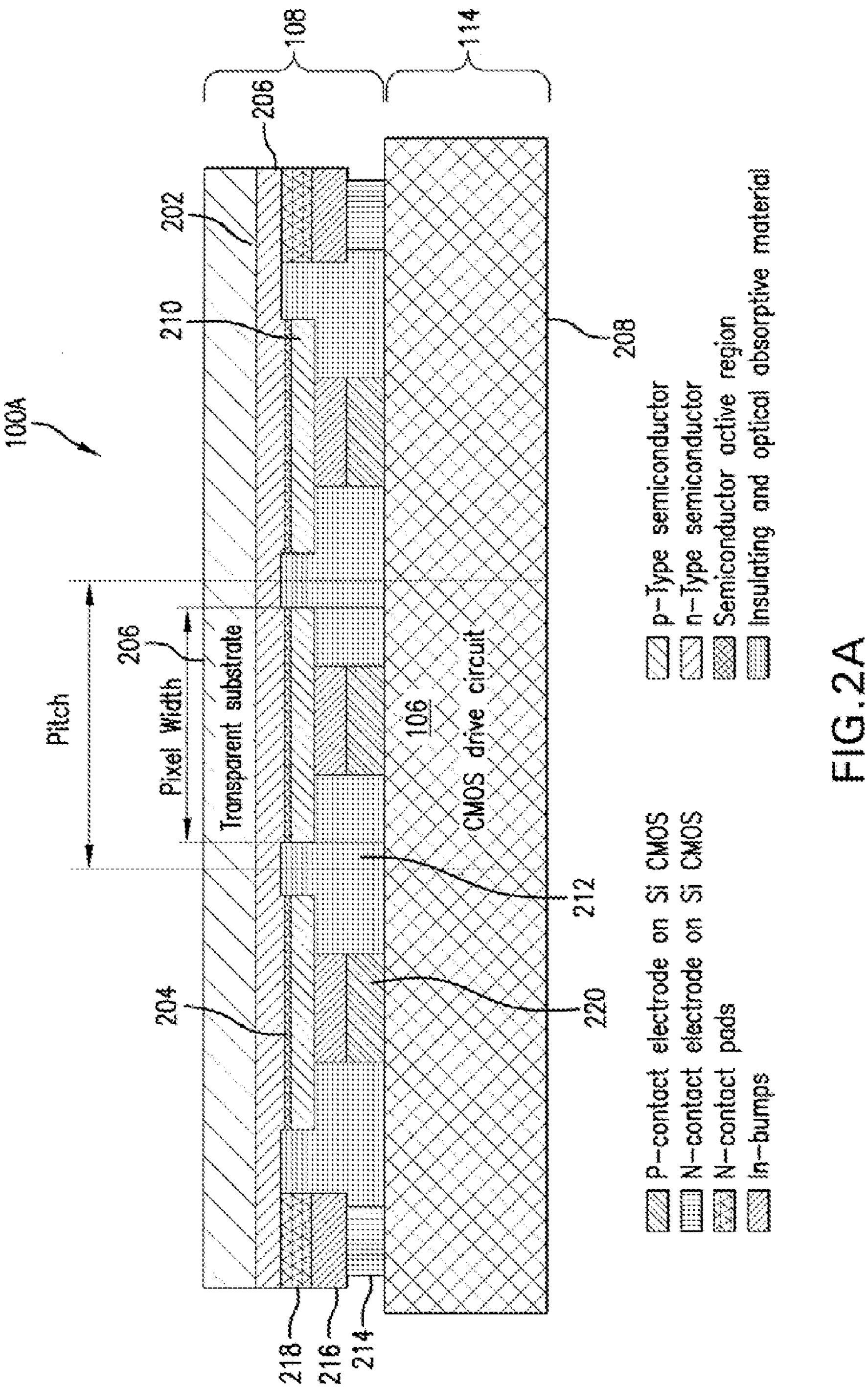
FIG. 2A illustrates a cross-sectional view of a high resolution microdisplay with micro-emitters arranged in a matrix format according to embodiments of the present invention.
Figure 2B:
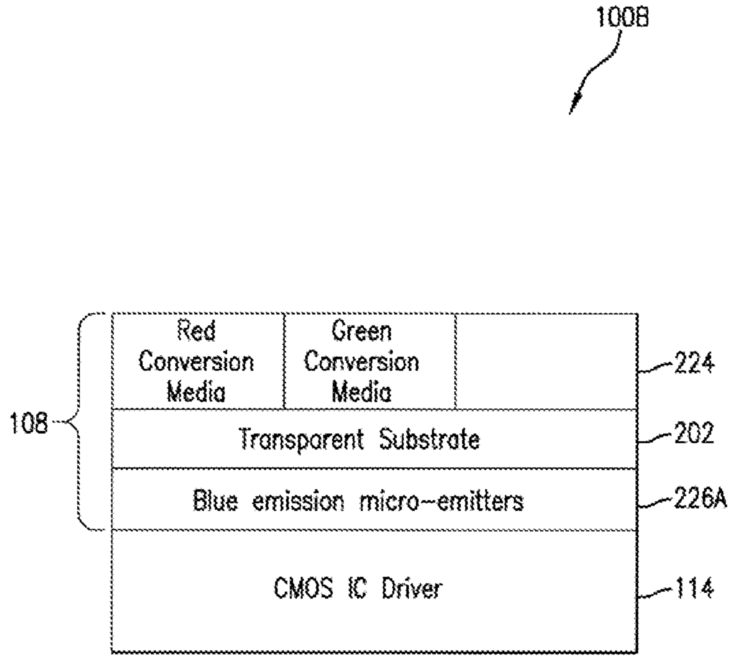
FIG. 2B illustrates a cross-sectional view of full-color microdisplay implementing blue emission with red-green (RG) color conversion media (CCM) according to embodiments of the present invention.
Figure 2C:
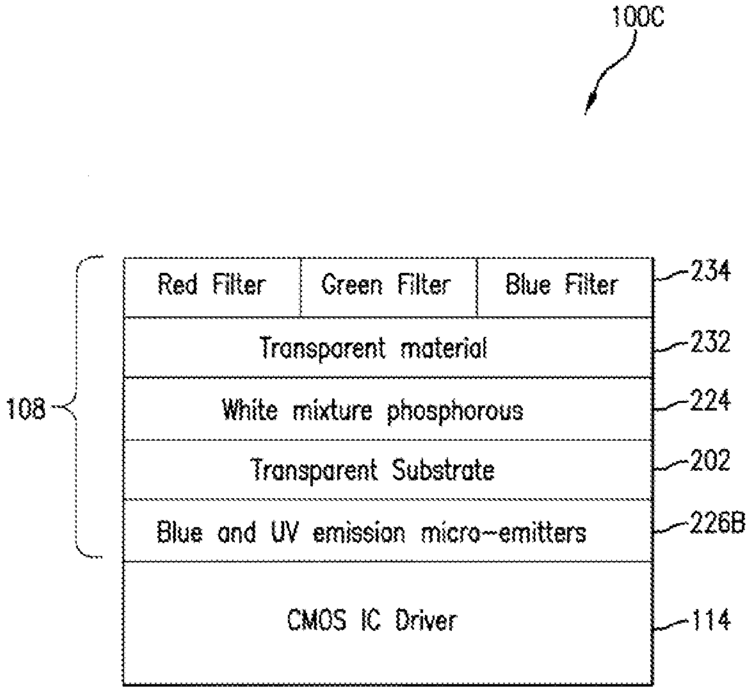
FIG. 2C illustrates a cross-sectional view of full-color microdisplay implementing white light emission in conjunction with color filters according to embodiments of the present invention.
Figure 3:
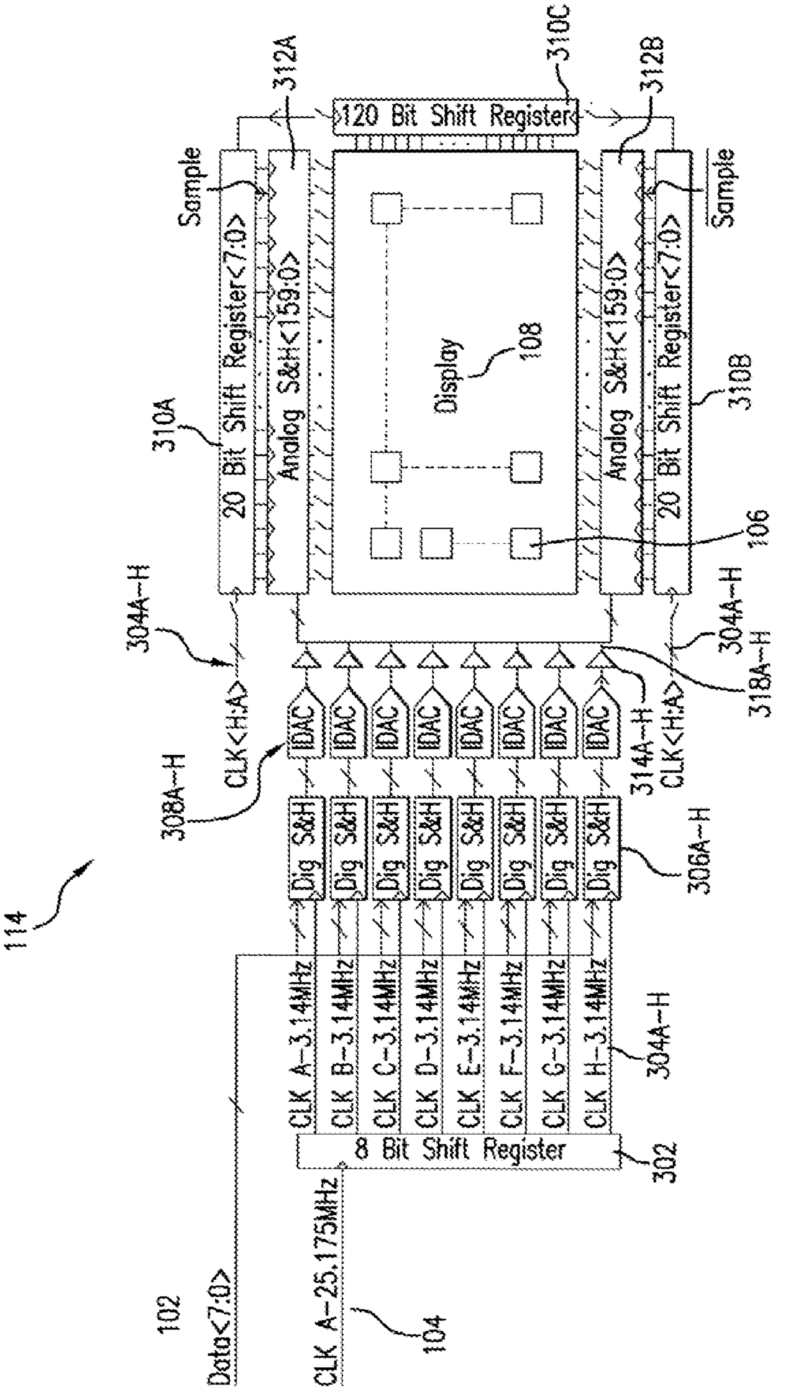
FIG. 3 illustrates a block diagram of CMOS microdisplay with control circuitry according to embodiments of the present invention.
Figure 4:
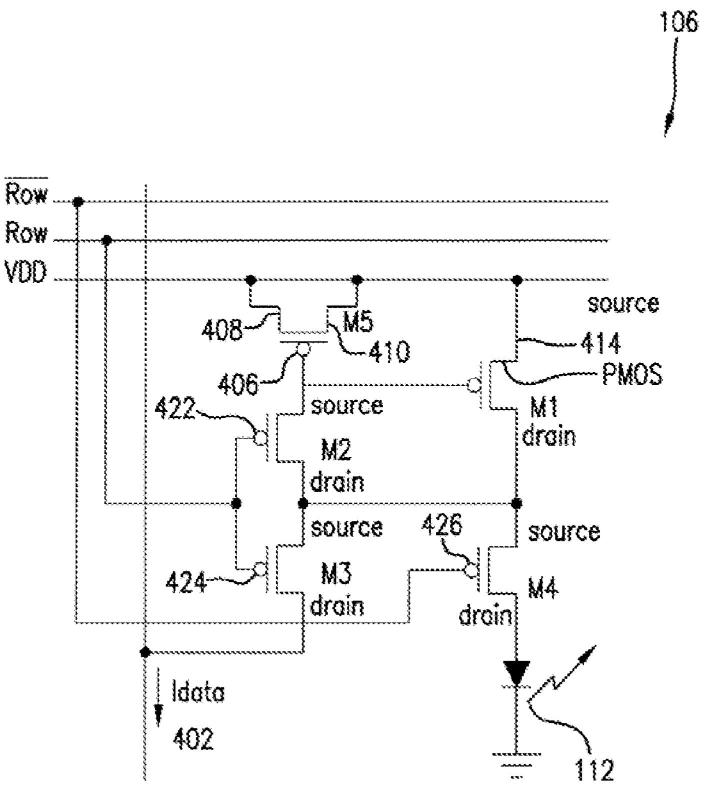
FIG. 4 illustrates a CMOS pixel driving circuit including all PMOS devices according to embodiments of the present invention.

Control circuitry 116 receives inputs of a clock signal 104 of 25.175 MHz and eight parallel digital pixel data (voltage) 102 at a rate of 25.175 MHz to control CMOS IC driver 114 for lighting up microdisplay 108. Control circuitry 116 includes an 8-bit shift register for converting a clock signal of 25.175 MHz into eight offset clock signals of 3.14 MHz. Cross-sectional views of the micro-emitter based microdisplay system 100 are illustrated in FIGS. 2A-C and described below. Exploded view of individual driving circuit 106 is illustrated in FIG. 4. Details of control circuitry 116 are illustrated in FIG. 3, 6-8 and described below.

FIG. 2A illustrates a cross-sectional view of microdisplay system 100A that includes microdisplay 108 integrated with CMOS IC driver 114 in an embodiment. Microdisplay system 100A includes an array of micro-emitters 112 as pixels arranged into matrix format on a substrate 202, which is optically transparent. For example, substrate 202 may be made of sapphire. Next to transparent substrate 202 is a layer of n-type semiconductor 206 in contact with an active region 204 for light emission. The width of active region 204 is the width of pixel 112. The pixel size or width of active region 204 may vary from 3-5 μm to 100 μm.

A p-type semiconductor 210 is in contact with active region 204 and has substantially the same size or width as active region 204. Each of active regions 204 and each of p-type semiconductors are separated by an insulator 212. N-contact electrode 214 and p-contact electrode 220 are attached to CMOS IC driver 114 that includes a number of CMOS pixel driving circuit 106. P-contact electrode 220 is connected to p type semiconductor 210 through indium bonding 216. N-contact electrode 214 of CMOS IC driver 114 is connected to n-contact pads 218 that are attached to n-type semiconductor 206. Active regions 204 share a common anode (n-type contact 218) with independently controllable cathode (p-type contact 210). The composition of active region 204 may be adjusted so that the micro-emitter based microdisplay 108 emits different colors. Front surface 206 of microdisplay 108, where the images are displayed, is the top surface of substrate 202.

In one embodiment, array of micro-emitters 112 may be based on III-nitride semiconductors. Active region 204 may be an InGaN/GaN optical active region that contains a single indium concentration for monochrome microdisplays or different indium concentrations in three InGaN/GaN active regions to emit red-green-blue (RGB) for full-color microdisplays.

In another embodiment, as described in U.S. patent Publication 20090078955, microdisplay 108 may also be based on the hybrid integration of InGaN semiconductors for blue and green emissions and AlGaInP semiconductors for red emission. The RGB micro-emitter array chip may be a vertically stacked 3D architecture based on wafer bonding, which is vertically integrated with a silicon CMOS active matrix driver or CMOS IC driver to form a full-color microdisplay system.

In a further embodiment, the full-color microdisplay may be formed by three side-by-side monochrome microdisplays emitting RGB colors which serve as primary color sub-pixels, to produce a single compound color pixel. The optical active region of the micro-emitters may contain AlInGaN materials with different aluminum and indium compositions emitting varying colors for the excitation of biological molecules. High efficiency InGaN for blue and green emissions and AlGaInP for red emission guarantee high power efficiency. The narrow bandwidth of RGB colors provides a color gamut exceeding current standards.

Microdisplay 108 may be integrated on silicon CMOS IC driver 114 by using flip-chip bonding. Flip-chip bonding is based on indium metal bumps 216, as illustrated in FIG. 2A. Microdisplay 108 may also be integrated on silicon CMOS IC driver 114 by using aligned wafer bonding. For high density microdisplays with pixels smaller than 20 μm, aligned wafer bonding process is preferable for integration of the microdisplay 108 with silicon CMOS IC driver 114 associated with a processor as a backplane on the opposite side of front surface 208.

FIG. 2B illustrates a cross-sectional view of a full-color microdisplay system 100B that includes microdisplay 108 integrated with CMOS IC driver 114. Full-color microdisplay system 100B includes a red-green (RG) color conversion media (CCM) layer 224 on top of transparent substrate 202 under which are blue micro-emitters 226A and CMOS IC driver 114. The blue emission from the micro-emitter active area of layer 226A passes through the patterned RG CCM to achieve RGB colors by absorption and re-emission processes. Microdisplay 108 are obtained by integrating color conversion media onto GaN microdisplays to obtain blue, green and red emissions in system 100B.

FIG. 2C illustrates a cross-section view of another full-color microdisplay system 100C that includes microdisplay 108 integrated with CMOS IC driver 114. Layer 224 includes solid state emission materials, such as powders containing white mixture phosphors, or polymers. Layer 224 is deposited on top of transparent substrate 202 under which are blue or UV micro-emitters 226B and CMOS IC driver 114. Layer 224 is covered by a transparent insulating layer 232. For example, transparent insulating layer 232 may be made of glass. On top of the transparent insulating layer 232 is a layer of RGB color filters 234. Microdisplay system 100C is based on blue or UV emitting InGaN microdisplay in conjunction with wavelength conversion media to white. With this white light emission, the RGB filters identical to those used in liquid crystal microdisplay can be patterned to achieve a well-balanced full-color display.

According to embodiments of the present invention, the semiconductor in FIGS. 2A, 2B and 2C includes, but not limited to, GaN, InGaN, AlGaN, AlGaInP, AlInGaN or InAlGaN and other III-V semiconductors. FIG. 3 illustrates a block diagram of control circuitry 116 according to embodiments of the present invention. Control circuitry 116 includes an 8-bit shift register 302, eight digital sample-and-hold circuits 306A-H, and eight current digital-to-analog converters (IDAC) 308A-H that convert digital data input 102 to analog current. Control circuitry 116 also includes eight buffers 314A-H that add driving capability. Control circuitry 116 also includes one hundred and sixty analog sample-and-hold circuits 312A on the top of microdisplay 108 and one hundred and sixty analog sample-and-hold circuits 312B on the bottom of microdisplay 108, which are used to program the array of pixels 112 of microdisplay 108.

CMOS IC driver 114 also includes 160×120 pixel driving circuits or drivers 106 under microdisplay 108 that includes an array of micro-emitters or pixels 112. The COMS IC driver controls the current through micro-emitters 112.

Control circuitry 116 further includes eight horizontal 20-bit shift registers 310A on the top of microdisplay 108 and eight horizontal 20-bit shift registers 310B near the bottom of microdisplay 108 and one vertical 120-bit shift register 310C. Each of 20-bit shift registers 310A-310B generates twenty subset clock signals of 157 kHz from each one of offset clock signals 306A-H of 3.14 MHz, which is divided by 20 such that analog sample-and-hold circuits 312A- or 312B operate at 157 kHz. Thus, one hundred and sixty subset clock signals of 157 kHz are generated from eight horizontal shift registers 310A or 310B. Horizontal 20-bit shift registers 310A or 310B control which analog sample-and-hold circuits capture analog pixel data 318A-H. Vertical 120-bit shift register controls to switch from one row of pixels 112 to the next row of pixels 112.

Control circuitry 116 has nine inputs that control microdisplay 108, including one clock signal 104 at 25.175 MHz and eight parallel digital pixel data 102 that all change at a rate of 25.175 MHz. The clock signal 104 of 25.175 MHz goes into an 8-bit shift register 302 that generates eight offset clock signals 304A-H of 3.14 MHz. Each of offset clock signals 304A-H is provided to each respective 8-bit digital sample-and-hold circuits 306A-H. All 8-bit digital pixel data 102 are passed to the data input of each of 8-bit digital sample-and-hold circuits 306A-H.

8-bit digital sample-and-hold circuits 306A-H take sample sequentially, which is controlled by offset clock signals 304A-H. More specifically, the first digital sample-and-hold circuit 306A captures the first 8-bit digital pixel data 102. The next digital sample-and-hold circuit 306B captures the second 8-bit digital pixel data 102. Then, the third digital sample-and-hold circuit 306C captures the third 8-bit digital pixel data 102, and so on. The output of each of 8-bit digital sample-and-hold circuits 306A-H changes as soon as the input of each digital pixel data 102 is sampled. Eight digital sample-and-hold circuits 306A-H are eight D-Flip Flops (DFF) in parallel.

Eight offset clocks 304A-H allow each of digital sample-and-hold circuits 306A-H to only capture every eighth digital pixel data 102. Digital sample-and-hold circuits 306A-H or DFFs need to operate at the highest desired frequency for 8-bit shift register 302, e.g. 25.175 MHz. Each of digital sample-and-hold circuits 306A-H outputs 8-bit pixel data to the input of a respective IDAC 308A-H. The output of digital sample-and-hold circuits 306A-H provides 8-bit data to each respective IDAC 308A-H. The output of each of IDACs 408A-H is buffered in the respective buffer to generate buffered analog pixel data or voltages 318A-H, which are input to one eighth of a total or one hundred and sixty analog sample-and-hold circuits 312A or 312B. The sampling function of analog sample-and-hold circuits is controlled by one of eight horizontal 20-bit shift registers 310A or 310B which has the same clock signal of the digital sample-and-hold, i.e. 3.14 MHz.

The respective analog sample-and-hold circuits 312A or 312B capture analog pixel data 318A-H based on the output of horizontal 20-bit shift registers 310A-310B. Once an entire row of analog sample-and-hold circuits 312A or 312B has captured its analog data 318A-H, vertical 120-bit shift register 310C switches to the next row of pixels 112 of microdisplay 108. For example, each of analog data 318A-H of a first row of analog sample-and-hold circuits 312A is programmed into each corresponding pixel 112, while a second row of analog sample-and-hold circuits 312B is programmed with analog pixel data 318A-H. This programming continues until the second row of analog sample-and-hold circuits capture their data. Then, vertical shift register 310C switches to the next row of pixels 112 of microdisplay 108, which is connected to the freshly programmed second row of analog sample-and-hold circuits 312B, while the first row of analog sample-and-hold circuits 312A starts over capturing the next row of analog pixel data 318A-H. This cycle continues in a loop in order to generate an optical image that refreshes fast enough to be unnoticeable to human eyes.

According to embodiments of the present invention, parallel data processing are used in control circuitry 116. Eight IDACs 308A-H and eight buffers 314A-H are used so that each IDAC and each buffer process every eighth pixel data. This parallel processing allows each IDAC to have an extended operation time within 320 ns instead of 40 ns for a typical VGA. This parallel processing also reduces the bandwidth needed for each buffer by a factor of eight. This design greatly reduces the power consumption of microdisplay and complexity required to achieve high bandwidth. Analog sample-and-hold circuits 312A-B can be designed with an extended sampling time of eight times.

FIG. 4 illustrates CMOS pixel driving circuit 106 that includes five p-type metal-oxide-semiconductor (PMOS) devices M1-M5 according to embodiments of the present invention. PMOS device M1 is configured as a switch to control the current through a micro-emitter 112 to light it up. PMOS devices M2-M4 are configured as switches such that the pixel driver can be minimized in dimension.

Figure 7:
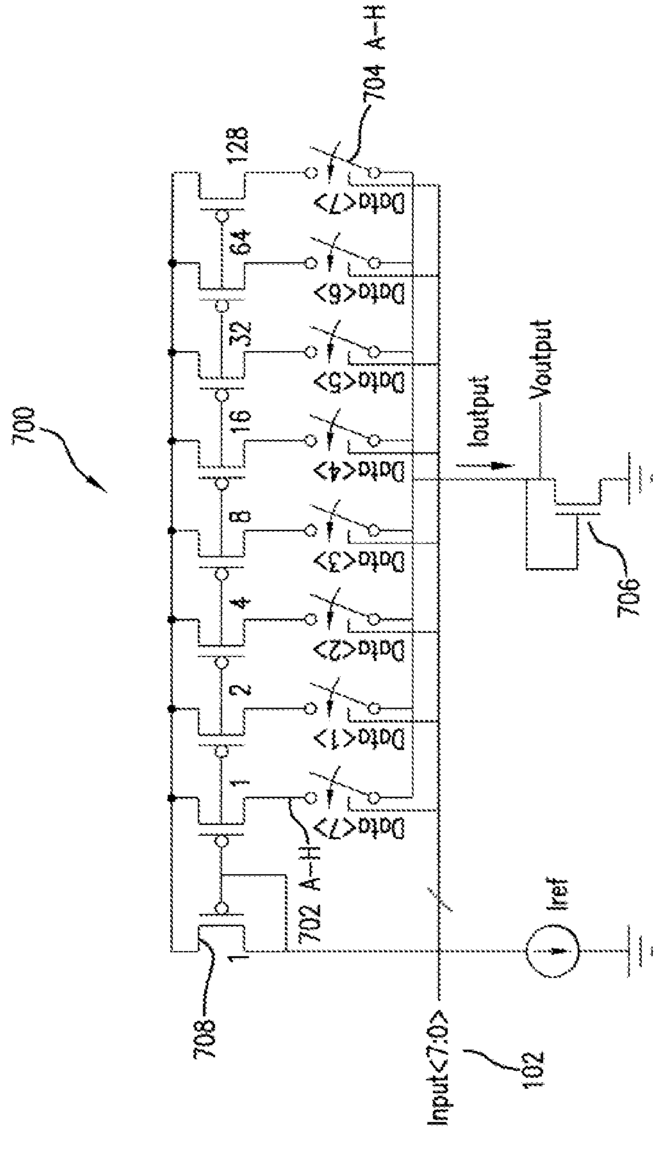
FIG. 7 illustrates an 8-bit binary current mirror for current digital-to-analog converters (IDAC) according to embodiments of the present invention.

There are two states of operation for CMOS pixel 112. A first state is when a pixel is addressed or driven by a desired current. A second state is when the pixel sustains the desired current through pixel 112. Specifically, PMOS devices or switches M1-M4 are controlled by ROW and ROW signals that come from the 120-bit vertical shift register 310C. ROW and ROW signals are binary numbers 1 or 0. In the first state, ROW is low such that switches M2 and M3 are closed, but switch M4 is open. Device M1 is configured as a diode with its drain connected to current Idata 402, which is generated by a respective analog sample-and-hold circuit 312A or 312B to control how much current to draw from a battery or VDD to flow through micro-emitter 112. A required gate voltage for the desired current is stored on M5. In the second state, ROW is high while reverse of ROW (i.e. ROW) is low such that switches M2 and M3 are open, but switch M4 is closed. Therefore, a path from the drain of M1 to the anode of LED or micro-emitter 112 is formed. The gate of M1 is now biased only by the voltage stored on capacitor M5, so that the gate to source voltage of M1 sets the current of LED or micro-emitter 112 to the desired current that is mirrored, for example, by current mirror 700 as illustrated in FIG. 7, during the first state or addressing state.

Pixel 112 is programmed by turning on switches M2 and M3 (i.e. M2 and M4 are close) and by turning off M4, i.e. M4 is open. Programming current Idata is forced through M1. M5 acts as a capacitor to store the voltage at the gate of M1. When switches M2 and M3 are turned off, and M4 is turned on, the gate to source voltage of M1 remains constant. Therefore, the same current Idata flows through M4 to micro-emitter 112.

PMOS device M5 is configured as capacitor by shorting drain 408 and source 410 that is connected to source 414 of M1, as illustrated in FIG. 4. Supply voltage VDD is applied to capacitor M5. Gate 422 of M2 is connected to gate 424 of M3 that receives input signal ROW. Gate 426 of M4 receives input signal ROW. The drain of M3 is connected to Idata. The drains of all M3s in an entire column are shorted together and share the same Idata signals.

In a particular embodiment, all PMOS devices M1-M4 have identical or same width, which allows common nodes of the M1-M4 devices to share gates, drains, or sources to reduce pixel driver area. M1-M4 may have the same length or different lengths. All M1-M5 may fit into a square of 15 μm by 15 μm. Although PMOS device is used at anodes of micro-emitter 112 in this embodiment, NMOS device may be used at cathodes of micro-emitters in an alternative embodiment. CMOS pixel driver 106 may include a combination of NMOS and PMOS devices in another embodiment.

It is important that switch M1 or current controller M1 operates in a saturation region, because it is difficult to guarantee that the drain to source voltage is the same in both the addressing and sustaining stages when current controller M1 is configured as a diode or connected to the anode of micro-emitter 112. This is apparent in the following equation for a saturation drain current of a long channel; MOSFET:

$$I_D = k'\frac{w}{l}(V_{gs} - V_t)^2$$

where $I_D$ is the drain current, k' is a process dependent constant, w and l are the width and length of a transistor, respectively, $V_{gs}$ is the voltage from gate to source and $V_t$ is threshold voltage. Note that the voltage from drain to source does not appear in the above equation.

Figure 5A:
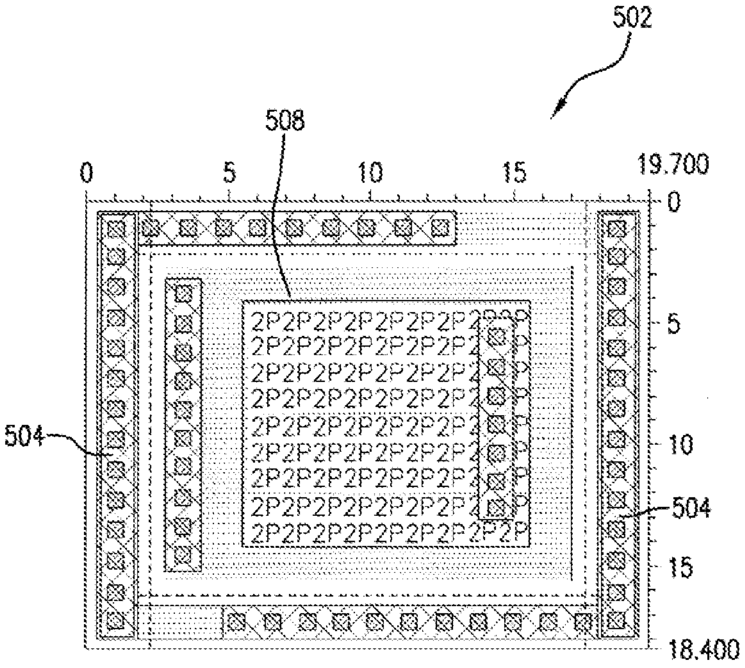
FIG.5A Prior Art
FIG. 5A illustrates a polysilicon capacitor layout of 100 μm2 area (prior art).

FIG. 5A illustrates an exemplary polysilicon capacitor 502 that has a dimension of 19.7 μm by 18.4 μm. Polysilicon capacitor 502 includes a guard ring 504 around a central portion 508 of polysilicon capacitor 502. Central portion 508 is slightly larger than PMOS capacitor 506. In addition, guard ring 504 further adds the dimension of polysilicon capacitor 502. Guard ring 504 is required to provide spacing or separation between p-type and p-type transistor or n-type and n-type transistor.

Figure 5B:
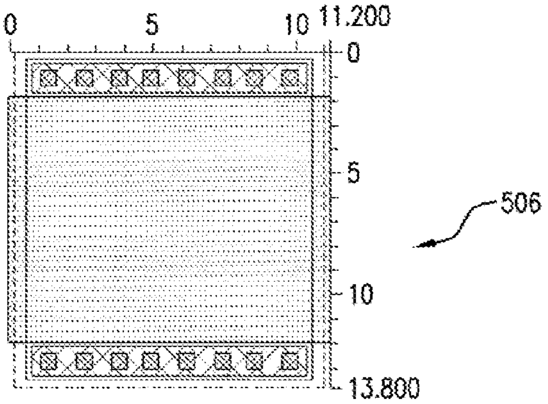
FIG. 5B illustrates a p-type metal-oxide-semiconductor (PMOS) capacitor layout with smaller area than the polysilicon capacitor of FIG. 5A according to embodiments of the present invention.

PMOS capacitor M5 has a comparable capacity to a polysilicon capacitor, but a smaller size. FIG. 5B illustrates an exemplary PMOS capacitor 506 or M5 in FIG. 4, which has a dimension of 11.2 μm by 13.8 μm. PMOS capacitor has the same length as PMOS switches, but a different width from PMOS switches. The separation in polysilicon capacitor 502 is not required in PMOS capacitor 506, which shares common drain, source, and gate connections with other PMOS devices M1-M4 in FIG. 4. As a result, PMOS capacitor 506 has significant reduction in area over polysilicon capacitor 502. Furthermore, polysilicon capacitor 502 requires one more step in silicon process than PMOS capacitor 506, because an additional mask is needed in processing polysilicon capacitor 502 such that manufacturing cost is higher than PMOS capacitor 506. By utilizing a design that includes all PMOS, as illustrated in FIG. 4, the whole pixel can be put into a single N-well so that process well spacing is not necessary. This design also minimizes area for pixel driver 106.

Figure 6:
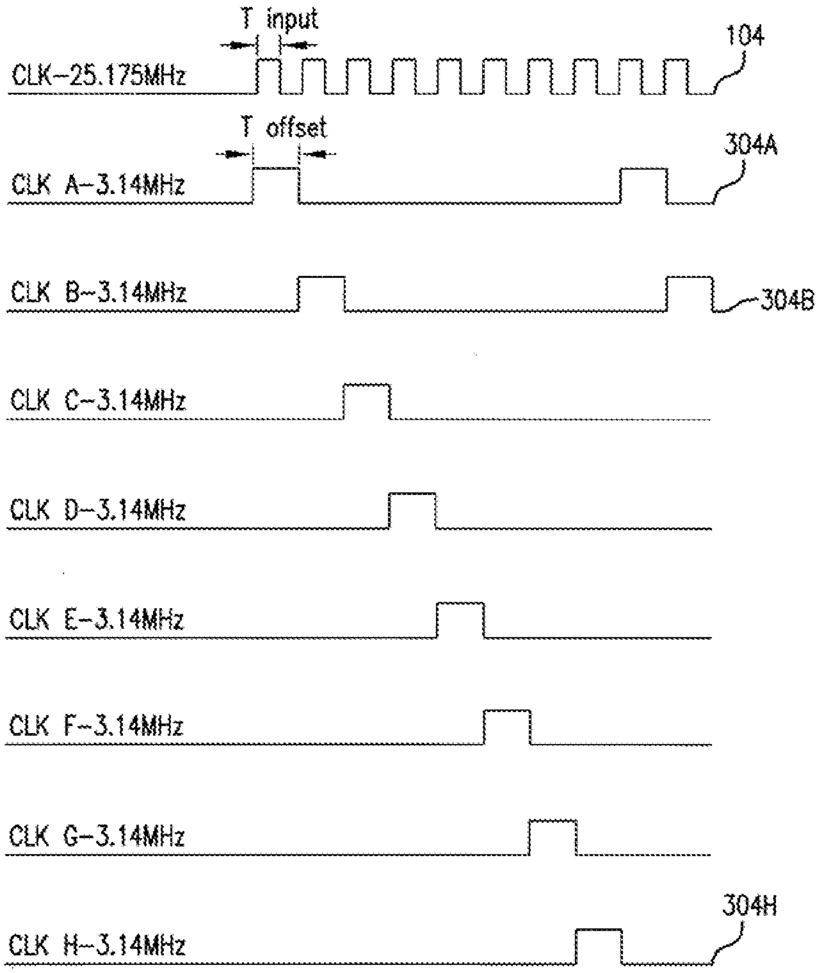
FIG. 6 illustrates waveforms of offset clock signals of 3.14 MHz generated by a clock signal of 25.175 MHz through an 8-bit shift register according to embodiments of the present invention.

FIG. 6 illustrates an exemplary waveform of input clock signal 104 of 25.175 MHz which is input for control circuitry 116, and waveforms of eight offset clock signals 304A-H of 3.14 MHz. Note that second offset clock signal 304B is delayed or offset one signal pulse from first offset clock signal 304A. Similarly, third offset clock signal 304C is delayed by one signal pulse from second offset clock signal 304B. Each of offset clock signals 304A-H is offset by one offset clock signal pulse duration Toffset, where Toffset is twice of input clock signal pulse duration Tinput. Thus, each of offset clock signals 304A-H has one eighth frequency of input clock signal 104.

FIG. 7 illustrates one embodiment of IDACs 308A-H or an 8-bit binary current mirror 700. Current mirror 700 provides current Ioutput and voltage Voutput based upon digital pixel data 102. Voutput is received by the buffers. As illustrated in FIG. 7, current mirror 700 includes nine PMOS devices 708, eight switches 704A-H, and one NMOS device 706 that converts current output Ioutput to a voltage output Voutput. When a source current Iref is provided, output current Ioutput may have any combinations of the binary numbers, 1, 2, 4, 8, 16, 32, 64 and 128, depending upon digital pixel data 102 that control switches 704A-H. For example, if Iref is 1 μA, Ioutput may be a sum of all the binary numbers, e.g. 256 μA. Ioutput may also be 128 plus 64 μA. Thus, Ioutput or Voutput is controlled by digital pixel data 102. Current mirror 700 operates at a clock signal of 3.14 MHz. Matching is critical for current mirror 700 so that the layout of the IDACs 308A-H is common centroid. In a particular embodiment, each of IDACs may have a dimension 325 μm by 260 μm.

In an alternative embodiment, a segmented DAC may be used. However, the segmented DAC adds significant complexity and area. The segmented IDAC requires eight 5-bit binary DACs and additional control circuits for thermometer decoding. The segmented IDAC also requires larger area than the current mirror 700 as illustrated in FIG. 7. Yet, it is still very difficult to ensure that the segmented DACs are fast enough to operate at a clock frequency of 25.175 MHz.

Figure 8:
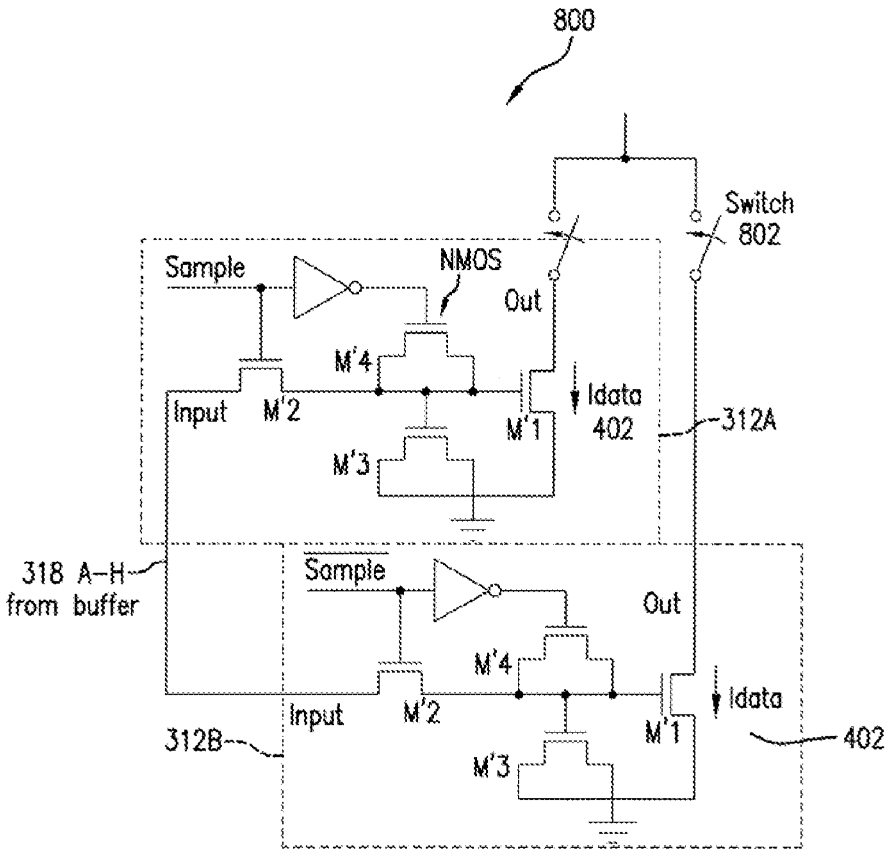
FIG. 8 illustrates two analog sample-and-hold circuits according to embodiments of the present invention.

One row of pixels 112 is addressed at a time, while the other rows of pixels 112 sustain their respective currents. This is accomplished by having two rows of sample-and-hold circuits 800 as illustrated in FIG. 8. Both rows of analog sample-and-hold circuits 312A-B operate in first and second states with the first row 312A being in the opposite state as the second row 312B at anytime. In the first state, each of sample-and-hold circuits 312A-B is individually programmed from each of buffers 314A-H. In the second state, outputs of all of the analog sample-and-hold circuits 312A or 312B are connected to a row of pixels such that the pixel data is programmed for the entire row of pixels 112 at once.

The duration of each state is controlled by the amount of time required to program one row of analog sample-and-hold circuits 312A-B. For a typical VGA active matrix microdisplay, each analog sample-and-hold circuit 312A or 312B needs to be programmed in a mere 40 ns. This stringent timing requirement also extends to IDACs and IDAC buffers. Currently, designing segmented DACs and high bandwidth buffers are used to meet such stringent requirements. For example, for a 0.6 μm CMOS technology, high supply voltage is needed to provide enough voltage to drive each of micro-emitters. However, both the required size of a segmented DAC and the high bandwidth are very difficult to achieve. Control circuitry 116 uses parallel data processing such that each of IDACs 308A-H has an operation time within 320 ns instead of 40 ns and each of buffers 314A-H reduces its bandwidth by a factor of eight.

FIG. 8 shows two analog sample-and-hold circuits 312A-B according to embodiments of the present invention, one in each dotted box. NMOS devices M'1-M'2 are configured as switches, and NMOS devices M'3-M'4 are configured as capacitors. Switch M'2 is coupled to analog pixel data 318A-H to control when to sample. The input labeled ‘Sample’ or (‘Sample’ in an opposite state) is a digital input that comes from horizontal row of 20-bit shift registers 310A-B. When ‘Sample’ is high, switch M'2 is a short circuit, so that the analog data 318A-H go to the gate of M'1. When 'Sample' goes low, switch M'2 acts as an open circuit and capacitors M'3 and M'4 store the analog voltage 318A-H that is just being sampled on the gate of M'1. This analog voltage 318A-H on the gate of M'1 makes M'1 have a current Idata through. When switch 802 is closed, current Idata is provided to driving circuit 106 of FIG. 4 to light up pixel 112.

During normal operation one row that includes one hundred and sixty analog sample-and-hold circuits 312A or 312B is programmed one at a time with the analog pixel data from the IDAC (through the buffers). During this time all M1 devices act as an open circuit, so that this row of analog sample-and-hold circuits 312A or 312B that is being programmed one at a time is not connected to the pixel driving circuits 106. While a top row of sample-and-hold circuits 312A is programmed one at a time with analog pixel data 318A-H, a bottom row that includes 160 analog sample-and-hold circuits 312B is connected to one full row of 160 pixel driving circuits 106 through the switch (acting as a short circuit) at the drain of each M'1. Analog sample-and-hold circuits 312A that have been previously programmed with buffered analog pixel data 318A-H provide current Idata. Each of analog pixel data or voltage 318A-H is stored on NMOS capacitors M'3 and M'4 at the gate of a NMOS M'1 which is matched to the output of IDACs 308A-H. This stored voltage creates current Idata through M'1. Current Idata is then programmed to pixel driving circuits 106 for the current row of pixels. While one row of analog sample-and-hold circuits 312A programs an entire row of pixels all at one time with stored analog data 318A-H, the other row of analog sample-and-hold circuits 312B is disconnected from pixel driving circuits 106 and is being programmed with the next row of analog pixel data 318A-H to be stored until it is time to program the row of pixels with that analog pixel data 318A-H.

In an alternative embodiment, analog sample-and-hold circuits 312A-B may also be designed with PMOS capacitors and PMOS switches. It is critical that these circuits 312A-B be as small as possible to ensure alignment with micro-emitters or pixels. In a particular embodiment, each of analog sample-and-hold circuits 312A-B may have a dimension 30 μm×60 μm.

Figure 9:
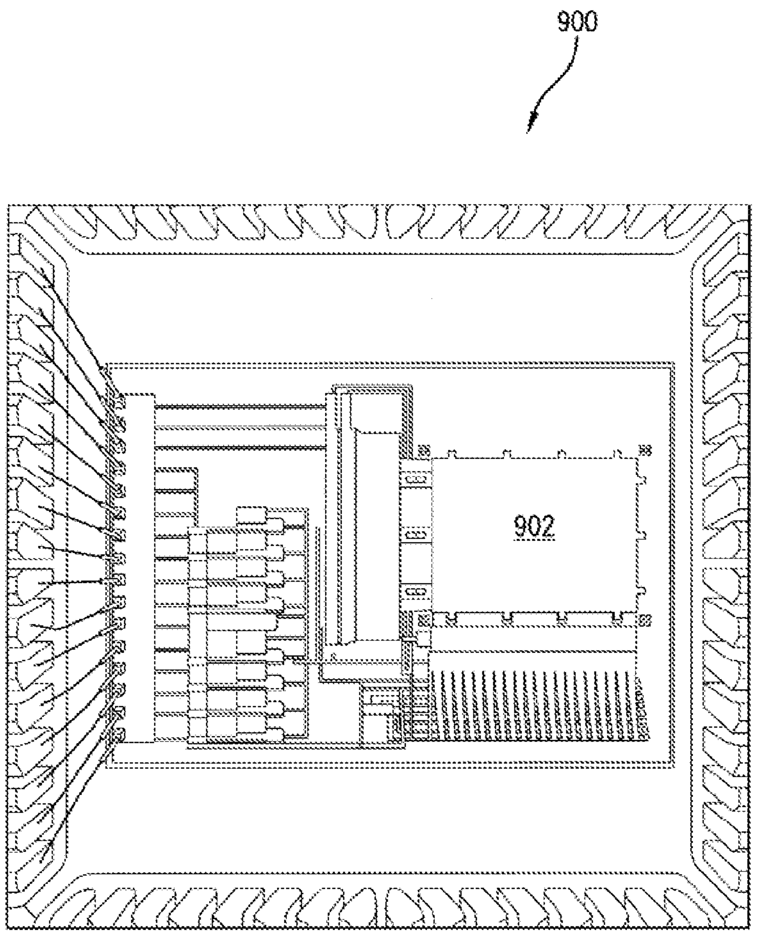
FIG. 9 illustrates a micrograph of CMOS microdisplay driver in a QFN padframe according to embodiments of the present invention.

FIG. 9 is a micrograph of a representative CMOS die or a Flat No leads packages such as Quad Flat No leads (QFN) padframe 900 fabricated according to embodiments of the present invention. The QFN padframe 900 has a dimension of 9 mm by 9 mm. Inside QFN package 900, a rectangle on the right is microdisplay 902 that has a dimension of 2.4 mm by 1.8 mm. Although FIG. 9 only illustrates a QFN padframe, other similar sized padframe may also be used.

Figure 10:
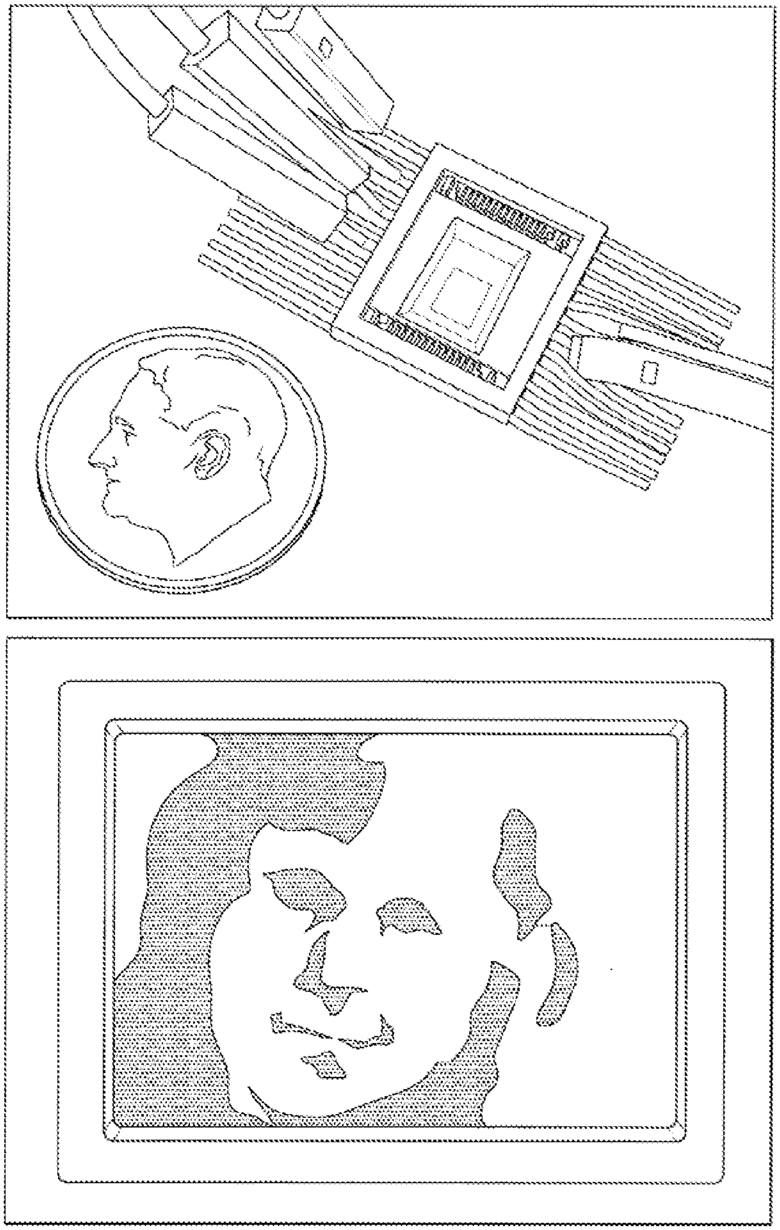
FIG. 10 illustrates InGaN high resolution green microdisplay in operation (left) and a projected image from an InGaN microdisplay (right) according to embodiments of the present invention.

FIG. 10 is a micrograph that demonstrates a successful operation of an InGaN microdisplay implementing the active matrix CMOS driving circuits 106 according to embodiments of the present invention. The microdisplay 108 has a pixel size of 12 μm and a pitch of 15 μm. The pitch is the center to center distance between two nearest pixels 112 on a TOW.

Having described several embodiments, it will be recognized by those skilled in the art that various modifications, alternative constructions, and equivalents may be used without departing from the spirit of the invention, for example, variations in dimensions and compositions of LED, material selections, p-type or n-type semiconductors, pixel sizes and number of pixels, or frequency of clock signals etc. Additionally, a number of well known processes and elements have not been described in order to avoid unnecessarily obscuring the present invention. Accordingly, the above description should not be taken as limiting the scope of the invention.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A microdisplay control circuitry for controlling an array of micro-emitters of an active matrix microdisplay, each of the micro-emitters in the array having an optically active region, the control circuitry comprising:

(i) an 8-bit shift register circuit configured to divide an input clock signal of a first frequency into eight offset clock signals of a second frequency, wherein the second frequency is ⅛ of the first frequency;

(ii) a plurality of digital sample-and-hold circuits configured to process an 8-bit pixel data of the first frequency in parallel to convert the 8-bit digital pixel data of the first frequency to eight digital pixel data of the second frequency;

(iii) a plurality of IDACs configured to receive the eight digital pixel data of the second frequency and to generate eight analog outputs;

(iv) a plurality of buffers configured to receive the eight analog outputs and output eight buffered analog pixel data; and (v) a plurality of analog sample-and-hold circuits each configured to control an output current through a transistor to a micro-emitter of the array of micro-emitters according to a pixel datum of the eight buffered analog pixel data.

2. The control circuitry of claim 1, wherein the optically active regions of the micro-emitters comprise at least one III-nitride semiconductor.

3. The control circuitry of claim 2, wherein the semiconductor comprises at least one of GaN, InGaN, AlGaN, AlGaInP, AlInGaN, and InAlGaN.

4. The control circuitry of claim 3, wherein the optically active regions comprise different indium concentrations in InGaN/GaN to emit red-green-blue (RGB) light for color microdisplay.

5. The control circuitry of claim 3, wherein the optically active regions comprise one indium concentration in InGaN/GaN for use in a monochrome microdisplay.

6. The control circuitry of claim 3, wherein the optically active regions comprise InGaN for blue and green emissions and AlGaInP for red emissions.

7. The control circuitry of claim 3, wherein the optically active regions comprise different indium and aluminum compositions in AlInGaN to emit red-green-blue (RGB) light for use in a color microdisplay.

8. The control circuitry of claim 1, wherein the plurality of analog sample-and-hold circuits are coupled to an array of CMOS driving circuits, each of the CMOS driving circuits coupled to one of the plurality of analog sample-and-hold circuits for controlling the currents to each respective micro-emitter, each driving circuit comprising metal-oxide-semiconductor field-effect transistor (MOSFET) devices, wherein the MOSFET devices comprise p-type metal-oxide-semiconductors (PMOS) or n-type metal-oxide-semiconductors (NMOS).

9. The control circuitry of claim 1, wherein the eight offset clock signals comprises at least a first offset clock signal and a second offset clock signal being offset for a time interval from the first offset clock signal.

10. The control circuitry of claim 9, wherein the time interval is one clock pulse duration of the offset clock signal, and the clock pulse duration of the offset clock signal is twice of a pulse duration of the input clock signal.

11. The control circuitry of claim 1, wherein the first frequency is 25.175 MHz, and the second frequency is 3.14 MHz.

12. The control circuitry of claim 1, wherein the PMOSs or NMOSs are configured to operate as switches, wherein the PMOSs or NMOSs have substantially the same widths to allow for common nodes to share gates, drains or sources for area reduction of the CMOS driving circuits.

13. The control circuitry of claim 1, wherein the PMOS or NMOS is configured to operate as a capacitor.

14. The control circuitry of claim 1, wherein the microdisplay is configured to bond to the array of CMOS driving circuits by flip-chip bonding.

15. The control circuitry of claim 1, wherein the micro-emitters have a width smaller than 20 μm.

16. The control circuitry of claim 15, wherein the microdisplay is configured to bond to the array of CMOS driving circuits by aligned wafer bonding.

17. The control circuitry of claim 1, wherein the array of the driving circuits has substantially the same pitch as the array of the micro-emitters.

18. The active matrix microdisplay of claim 1 wherein the voltage held on the sample-and-hold capacitor is determined in part by characterizing the output MOSFET.

19. The active matrix microdisplay of claim 1 wherein the voltage held on the sample-and-hold capacitor is determined in part by forcing a desired current through the output MOSFET in a diode configuration and determining a gate voltage of the output MOSFET.

20. An active matrix microdisplay system comprising:

an array of micro-emitters wherein optically active regions of the micro-emitters comprise at least one III-nitride semiconductor;

an array of CMOS driving circuits, each of the CMOS driving circuits coupled to a respective micro-emitter for controlling current to each respective micro-emitter, each driving circuit comprising metal-oxide-semiconductor field-effect transistor (MOSFET) devices;

wherein each CMOS driving circuit of the array of CMOS driving circuits is capable of supplying an adjustable driving current of greater than 0.01 μA and wherein the adjustable driving current is determined by a voltage held on a sample-and-hold capacitor; the driving current being provided to a micro-emitter through an output MOSFET of the driving circuit.

21. The active matrix microdisplay of claim 20, wherein the at least one III-nitride semiconductor is selected from the group comprising GaN, InGaN, AlGaN, AlGaInP, AlInGaN, and InAlGaN.

22. The active matrix microdisplay of claim 20 wherein the sample and hold is set at least in part according to an output voltage of a digital-to-analog converter.

23. The active matrix microdisplay of claim 20 wherein the voltage held on the sample-and-hold capacitor is determined in part by characterizing the output MOSFET.

24. The active matrix microdisplay of claim 20 wherein the voltage held on the sample-and-hold capacitor is determined in part by forcing a desired current through the output MOSFET in a diode configuration and determining a gate voltage of the output MOSFET.

25. An active matrix microdisplay system comprising:

an array of micro-emitters wherein optically active regions of the micro-emitters comprise at least one III-nitride semiconductor;

an array of CMOS driving circuits, each of the CMOS driving circuits coupled to a respective micro-emitter for controlling current to each respective micro-emitter, each driving circuit comprising metal-oxide-semiconductor field-effect transistor (MOSFET) devices;

wherein each CMOS driving circuit of the array of CMOS driving circuits is capable of supplying an adjustable driving current through an output transistor of greater than 0.01 μA and wherein the adjustable driving current is determined by a voltage held on a sample-and-hold capacitor;

and wherein the voltage held on the sample-and-hold capacitor is determined at least in part by characterizing the output transistor.

* * * * *